United States Patent
Buchner

(10) Patent No.: US 12,365,252 B2
(45) Date of Patent: Jul. 22, 2025

(54) METHOD FOR OPTIMIZING THE DRIVING STRATEGY OF A RAIL VEHICLE, DATA PROCESSING APPARATUS, COMPUTER PROGRAM PRODUCT, COMPUTER-READABLE MEDIUM, AND A RAIL VEHICLE HAVING AN ENERGY-STORAGE DEVICE, ENERGY-GENERATING DEVICE, AND DATA PROCESSING APPARATUS

(71) Applicant: STADLER RAIL AG, Bussnang (CH)

(72) Inventor: Andreas Buchner, Constance (DE)

(73) Assignee: STADLER RAIL AG, Bussnang (CH)

( * ) Notice: Subject to any disclaimer, the term of this patent is extended or adjusted under 35 U.S.C. 154(b) by 215 days.

(21) Appl. No.: 18/451,290

(22) Filed: Aug. 17, 2023

(65) Prior Publication Data
US 2024/0059158 A1 Feb. 22, 2024

(30) Foreign Application Priority Data
Aug. 22, 2022 (EP) .................... 22191416

(51) Int. Cl.
*B60L 15/20* (2006.01)

(52) U.S. Cl.
CPC ....... *B60L 15/2045* (2013.01); *B60L 2260/52* (2013.01); *B60L 2260/54* (2013.01)

(58) Field of Classification Search
CPC ............ B60L 15/2045; B60L 2260/52; B60L 2260/54; B60L 2200/26; B60L 58/13; B60L 58/30; B60L 50/75
See application file for complete search history.

(56) References Cited

FOREIGN PATENT DOCUMENTS

| DE | 101 45 514 A1 | 4/2003 |
|---|---|---|
| DE | 10 2017 213 088 A1 | 1/2019 |
| WO | 2022/008413 A1 | 1/2022 |

OTHER PUBLICATIONS

H. Farooqi et al., "Shrinking horizon parameterized predictive control with application to energy-efficient train operation", Automatica, 112, 108635, pp. 1-9, Oct. 26, 2019 See European Search Report. European Search Report Corresponding to 22191416.1 mailed Feb. 9, 2023.

*Primary Examiner* — Alan D Hutchinson
(74) *Attorney, Agent, or Firm* — Finch & Maloney PLLC

(57) ABSTRACT

The invention concerns a method, in particular a computer-implemented method, for optimizing the driving strategy of a rail vehicle having an energy-generating device and an energy-storage device. The method comprises the steps of dividing a route to be driven into at least one, in particular several, route sections, combining the at least one route section into at least one horizon, determining an energy demand of the at least one horizon, determining a substantially constant energy consumption rate of the energy-generating device of the rail vehicle for the horizon, at which the state of charge of the energy-storage device for the horizon lies within an optimum range.

18 Claims, 6 Drawing Sheets

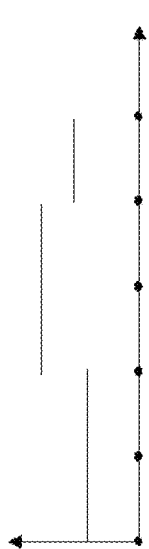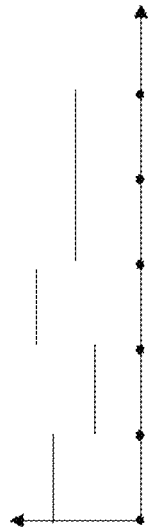

Figure 1:
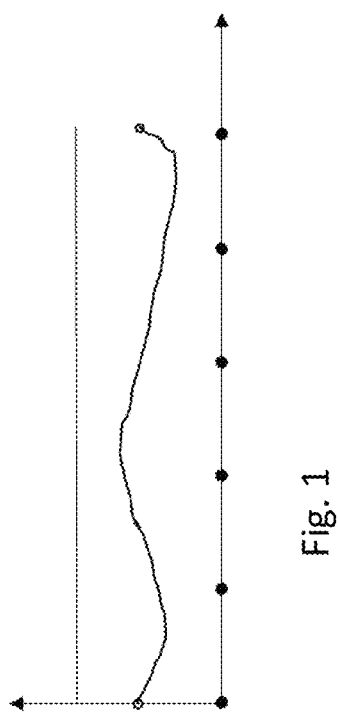

|  | Horizont 1 | Horizont 2 | Horizont 3 | Horizont 4 | Horizont 5 | Horizont 6 | Horizont 7 |
|---|---|---|---|---|---|---|---|
| 1 | 7 |   |   |   |   |   |   |
| 2 | 4 | 3 |   |   |   |   |   |
| 3 | 2 | 2 | 3 |   |   |   |   |
| 4 | 2 | 2 | 2 | 1 |   |   |   |
| 5 | 1 | 1 | 1 | 2 | 2 |   |   |
| 6 | 1 | 1 | 1 | 1 | 1 | 2 |   |
| 7 | 1 | 1 | 1 | 1 | 1 | 1 | 1 |

Fig. 7

Fig. 9

METHOD FOR OPTIMIZING THE DRIVING STRATEGY OF A RAIL VEHICLE, DATA PROCESSING APPARATUS, COMPUTER PROGRAM PRODUCT, COMPUTER-READABLE MEDIUM, AND A RAIL VEHICLE HAVING AN ENERGY-STORAGE DEVICE, ENERGY-GENERATING DEVICE, AND DATA PROCESSING APPARATUS

The invention relates to a method for optimizing the driving strategy of a rail vehicle, a data processing apparatus, a computer program product, a computer-readable medium, and a rail vehicle having an energy-storage device, an energy-generating device, and a data processing apparatus.

Generally, energy-generating devices, such as internal combustion engines, for vehicles are optimized for specific objectives. The energy-generating devices then typically operate optimally only at certain operating points or relatively narrow operating ranges. Outside these ranges, for example, there may be increased fuel consumption or reduced service life of the energy-generating device. The aim is therefore to operate such energy-generating devices in an optimum or most advantageous operating range.

In vehicles with hybrid powertrains, i.e. a powertrain comprising an energy-storage device as well as an energy-generating device, there is consequently a degree of freedom. The degree of freedom is the choice of power sharing between the two parts of the powertrain. Thus, it is an optimization problem. The optimal power sharing is not static but depends on the specific characteristics of the energy-generating device and the energy-storage device.

The use of a fuel cell as an energy-generating device has the highest efficiency and thus the highest energy efficiency in a medium load range. Very low and very high loads have a negative influence on the lifetime of the fuel cell. Furthermore, it is unfavourable to frequently change the operating point.

Furthermore, an energy-storage device such as an electric battery is preferably operated in a relatively narrow range of its storage capacity to avoid premature aging.

Methods therefore exist for achieving a globally optimal solution for a given driving distance. WO 2022/008413 discloses, for example, a method for operating an electric drive system in which a vehicle has a fuel cell and an energy storage system. The planning of the energy supply for an overall route to be covered is carried out in such a way that, based on a specified power level of the fuel cells, it is determined whether the necessary additional power of the battery leads to undesirable operating states of the battery. Where this is the case, the power level of the fuel cells is adjusted accordingly. The calculation for the entire route is then repeated to iteratively determine the strategy for supplying power to the vehicle over the entire route. A disadvantage is the resulting high computational effort due to the many iterations as well as the danger that the algorithm determines only very small sections of constant fuel cell power in the case of unfavourable routes or traffic conditions. Furthermore, a globally optimal solution does not take into account how external influences such as the operating situation, the driving behaviour of the driver, driving resistances, solar radiation and other unpredictable effects affect the driving strategy.

It is therefore an object of the present invention to avoid the disadvantages of the prior art and, in particular, to provide a method that can determine an optimized driving strategy for the vehicle with little effort.

The object is solved by a method, a data processing apparatus, a computer program product, a computer-readable medium, and a rail vehicle according to the independent claims.

In particular, the object is solved by a method, especially a computer-implemented method, for optimizing the driving strategy of a rail vehicle having an energy-generating device and an energy-storage device. The method comprises the steps of
  Dividing a route to be driven into at least one, in particular several, route sections,
  Combining the at least one route section into at least one horizon,
  determining an energy demand of the at least one horizon,
  determining a substantially constant energy distribution rate of the energy-generating device of the rail vehicle for the horizon, at which the state of charge of the energy-storage device for the horizon is within an optimal range.

It is thus possible to pre-select a manageable number of the best possible solutions, among which there are one or more solutions of quality greater than 95%.

The target criteria of the optimization are efficiency and lifetime of the energy systems. In the case of a fuel cell as an energy-generating device, operation of the fuel cell in the medium load range is optimal for both lifetime and efficiency. In the case of a battery as an energy-storage device, operation centered in the smallest possible operating range at a State Of Charge (SOC) of 50% is optimal for lifetime.

The fuel cell can be operated with any fuel, preferably hydrogen or another hydrogen-containing gas such as natural gas.

The trade-off is therefore that constant operation of the fuel cell leads to a maximum state-of-charge range of the energy-storage device and a minimum state-of-charge range of the energy-storage device leads to a maximum volatility of the fuel cell performance.

The solution according to the invention leads to a way to resolve this trade-off.

The energy demand of a horizon can be determined by simulation and/or measurements with the vehicle on the operating track.

The method is of course applicable in rail vehicles.

Furthermore, an application in regular service buses, coaches, trucks or even passenger cars is also conceivable.

Advantageously, however, the overall route is known in advance so that the method can be optimally applied.

The energy-generating device is preferably a fuel cell. Compared to an internal combustion engine, the fuel cell has a better efficiency.

The optimum range of the state of charge is essentially 30% to 70% of the maximum charge of the energy-storage device, in particular essentially 40% to 60% of the maximum charge of the energy-storage device.

In such a range, the lifetime of the energy-storage device is optimal.

A route section is a subset of an overall route to be travelled. For example, a route section may extend from stop to stop. Alternatively, route sections may extend from significant route points to other significant route points where, for example, the power requirement of the traction changes significantly such as a change in the maximum allowed speed, the beginning or end of an incline, the beginning or end of a decline, or a tunnel section.

A horizon is a subset of contiguous route sections or a route section where the energy distribution rate of the energy-generating device, such as the operating point of the fuel cells, is kept substantially constant. Thus, the minimum number of horizons is one, in which case the operation of the energy-generating device is constant over the entire route to be travelled. The maximum number of horizons corresponds to the case where the number of horizons is equal to the number of route sections. Thus, the constant operation of the energy source during travel is only constant in a single route section at a time.

Thus, horizon variants can be formed comprising a minimum number, a maximum number and at least one intermediate number, where the minimum number of horizons is one, the maximum number of horizons is equal to the number of route sections and the intermediate number is between the minimum and maximum numbers, preferably the intermediate number is equal to the number of route sections minus two.

With n existing route sections, a total of n horizon variants can be formed. First the minimum number and maximum number of horizons and then n minus two intermediate numbers of horizons, where starting from one the number of horizons formed is increased by one in each case. The number of route sections is divided by the number of desired horizons and rounded, the result is the number of route sections per horizon, the remainder is assigned to the last horizons in such a way that they are at most one route section longer or shorter than the front horizons.

A proportional total energy demand of the route to be driven can be determined for each horizon.

This determination establishes a comparative value for the horizon.

The proportional total energy demand of the route to be travelled for each horizon can be determined by distributing the total energy demand of the overall route among the horizons. The distribution can be determined by the time share of the horizon in the total travel time of the overall route. For example, if a horizon comprises 25% of the travel time, it is allocated a proportionate total energy demand of 25% of the total energy demand.

Additional energy variants can be determined for each horizon, each of which results in a non-charge retaining operation during the horizon.

Therefore, for the additional energy variants, the state of charge of the energy-storage device at the end of the horizon is not the same as the state of charge at the beginning of the horizon. The state of charge may be larger or smaller.

Thus, some variation in the energy storage system is allowed and thus the variants are not unnecessarily restrictive.

The additional energy variants can be in an additional energy range whose first limitation (ZE1) corresponds to the proportional total energy demand ($aGE_{Hx}$) of the route to be taken by the horizon. The second limitation ($ZE_2$) corresponds to the sum of the proportional total energy demand ($aGE_{Hx}$) of the route to be travelled by the horizon and twice the difference between the energy demand of the horizon ($E_{Hx}$) and the proportional energy demand of the horizon ($aGE_{Hx}$).

This corresponds to the following formulas for the boundary of the additional energy range:

$$ZE_1 = GE_{Hx}$$

$$ZE_2 = aGE_{Hx} + 2*(E_{Hx} - aGE_{Hx})$$

The additional energy variants can be specified such that the individual additional energy variants each have the same distance from one another and, in particular, the distance in each case is in the range of 5% of the additional energy range. A 5% increment would therefore result in, for example, 18 additional energy variants per horizon.

Thus, a range is evenly covered.

A quality assessment of the horizon variants and/or the additional energy variants can be performed, with the quality assessment taking into account at least one of the following factors. Predicted fuel consumption of the overall route and/or charge level variation of the energy storage system on the overall route and/or exceeding or falling below charge level limits on the overall route and/or deviation of an actual charge level of the energy storage system at the end of the overall route from a predicted charge level at the beginning of the route, wherein the quality assessment is used to determine the most favourable energy distribution rate.

Thus, after the evaluation, an optimum value of the energy distribution rate of the energy-generating device is output, which is set for the particular horizon.

The quality assessment can be performed by the following formula:

$$J = H_2 + SOC_{Hub}\lambda 1 + \Delta SOC_{End}\lambda 2 + \Delta SOC_{Low}\lambda 3 + \Delta SOC_{High}\lambda 4$$

Where
H2 is the fuel consumption of the particular variant,
$SOC_{high}$ maximum value of the state of charge (SOC),
$SOC_{low}$ minimum value of the state of charge (SOC),
$SOC_{Hub}$ the difference between $SOC_{high}$ and $SOC_{low}$ of the respective variant,
$\Delta SOC_{end}$ the deviation of the state of charge (SOC) at the end of the variant.
$\Delta SOC_{low}$ value for a deviation from $SOC_{low}$ if present.
$\Delta SOC_{high}$ Value for a deviation from $SOC_{high}$ if present.
$\Lambda_{1-4}$ weighting factors determined for each route by simulation.

The optimum evaluation of the weighting factors is determined in the simulation and later on the test ring. In the end, the choice depends on application-specific variables, i.e. on the one hand on the driving task and on the other hand on the vehicle equipment, i.e. the dimensioning of the drive components.

Examples of weighting factors:
$\lambda 1$
default=1.

For projects with high focus on fuel consumption, e.g., with tightly dimensioned tank capacity=1.75. In worst case scenarios (high load, high outside temperature)=3.75.

For projects with high focus on SOC operating range, e.g., with tightly dimensioned total traction battery capacity.=0.75. In worst case scenarios (high loading, high outside temperature)=0.55.

$\lambda 2$-$\lambda 4$

In principle, a deviation from SOCziel is not to be weighted identically to falling below SOCmin or exceeding SOCmax. Therefore, by default, $\lambda 4$ is significantly lower than $\lambda 2$ and $\lambda 3$. Furthermore, $\lambda 2$ is to be weighted higher than $\lambda 3$, since falling below SOCmin not only has a damaging effect on the component traction battery, but also poses the additional risk of the battery no longer being ready for use, since no more energy is available.

$\lambda 2$=by default=2
$\lambda 3$=by default=1
$\lambda 4$=by default=0.2

Again, there is a strong dependence on the application. E.g., it may be necessary to weight λ4 higher (=1) and to reduce λ3 (=0.5) if a SOC target must be achieved in a project, e.g., in order to be able to complete a subsequent battery-only route, even if SOCmax must be exceeded for this purpose.

The lowest value for this function is the optimal variant.

Thus, optimal operation of the energy-generating device and energy storage system is possible.

The method as previously described can be repeated for the remaining route sections after passing through one route section.

Unpredictable factors influencing the energy consumption are taken into account by restarting the method after driving through a route section and thus the actual SOC at the end of the route section can be taken into account. A new driving profile is thus determined for the remainder of the route after each route section has been traversed.

This allows the calculation to be adapted to unpredictable factors such as driver behaviour or weather conditions. Furthermore, this method can be used without knowing the overall route and travel time in advance due to this adaptation after each route section passed through.

To solve the object further leads a data processing apparatus comprising means for executing the method as described before.

Further leading to the solution of the object is a computer program product comprising instructions which, when the method is executed by a computer, cause the computer to execute the method as previously described.

Further leading to the solution of the object is a computer-readable medium on which the computer program product as previously described is stored.

Further leading to the solution of the object is a rail vehicle having an energy-storage device, an energy-generating device, and a data processing apparatus as previously described.

Figure 2:
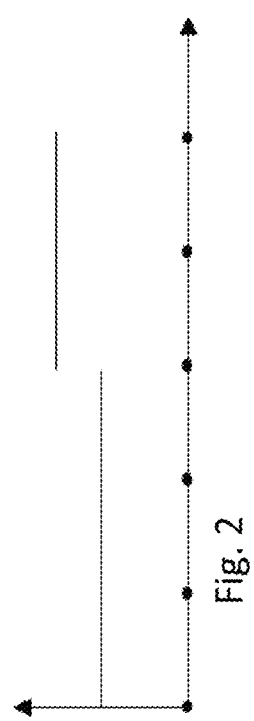
Figure 5:
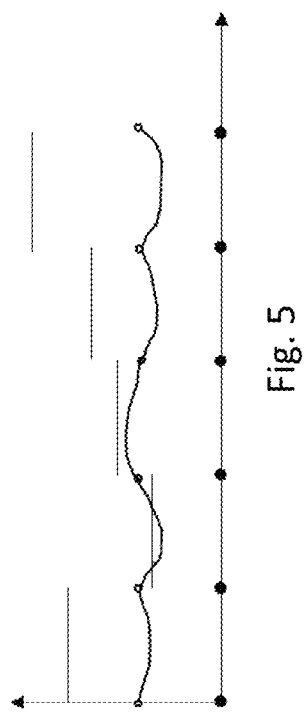
Figure 6:
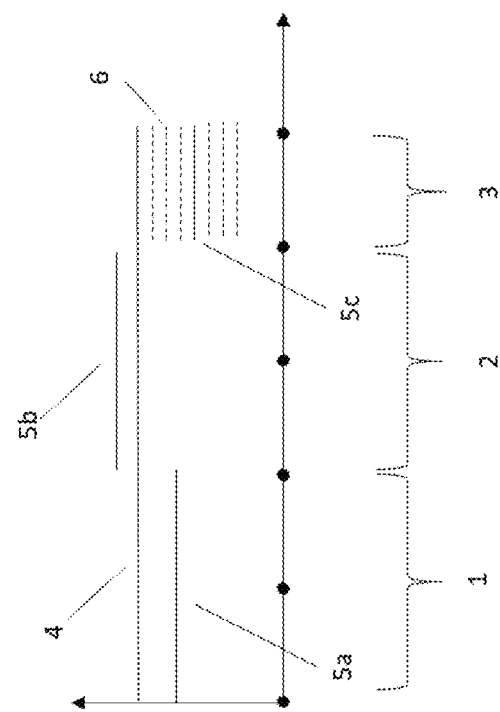
Figure 8:
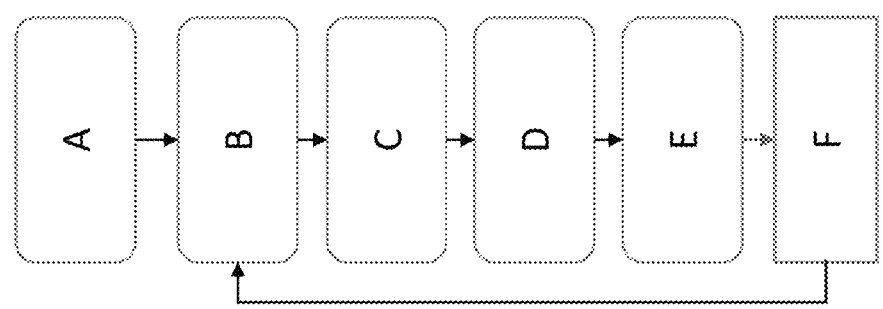

The invention is further described below with reference to figures. Thereby shows:

FIG. 1 a first variant of the division of an overall route to be travelled,

FIG. 2 a second variant of the division of an overall route to be driven,

FIG. 3 a third variant of the division of an overall route to be driven,

FIG. 4 a fourth division of the overall route to be driven,

FIG. 5 a fifth division of the overall route to be driven,

FIG. 6 an overall route divided into horizons with intermediate variants of the horizons, FIG. 7 an exemplary division of horizon variants for seven route sections, FIG. 8 a basic flow chart of the method, FIG. 9 shows a cost matrix for the quality function.

FIG. 1 shows a route of a train to be driven, where the route is shown on the X-axis. The route to be driven is divided into route sections represented by points on the X-axis. In this case, the route is divided into exactly one horizon with five route sections. The power of the fuel cells is represented by the constant line (upper line). The Y-axis represents either the energy-generating rate of the energy-generating device or the state of charge of the energy-storage device. The energy-storage device does not have a linear charge curve, but the state of charge at the beginning of the route to be driven and at the end of the route to be driven are the same.

FIG. 2 shows an example of the division of the route X to be driven into two horizons, where the first horizon comprises three route sections and the second horizon comprises two route sections. The energy-generating rate of the energy-generating device is not equal in the two horizons shown but is greater in the second horizon than in the first horizon. Within the horizon, however, the energy generation rate is constant.

FIG. 3 shows the situation from FIG. 1, whereby the route to be driven is now divided into three horizons. The first horizon comprises two route sections, the second horizon also comprises two route sections and the third horizon comprises one route section. The shape of the state-of-charge curve (not shown) is essentially the same as the state-of-charge curve shown in FIG. 1, with the state-of-charge at the beginning and end of each horizon being the same. The energy-generating rate of the energy-generating device in each horizon is constant within the horizon, but it changes from horizon to horizon.

FIG. 4 shows the same route to be driven from FIG. 1 in a variant with four horizons. The first route section corresponds to one horizon, the second route section corresponds to one horizon, the third route section corresponds to one horizon and the last horizon comprises the fourth and fifth route sections. The shape of the state-of-charge curve (not shown) is essentially the same as that shown in FIG. 1, with the state of charge of the energy-storage device being the same at the beginning and end of each horizon.

FIG. 5 shows the maximum number of horizons, where the number of horizons corresponds to the number of route sections of the route to be driven. At each horizon, the state of charge is constant at the beginning and at the end. The energy distribution rate of the energy-generating device is constant within the horizons and differs, however, in each case to the adjacent horizon. The state-of-charge curve is also shown here.

FIG. 6 also shows the division of the route into five route sections (X-axis) where the first horizon 1 comprises two route sections, the second horizon 2 also comprises two route sections and the third horizon comprises one route section. The total energy rate 4 to cover the required energy for the entire route would be represented as a constant energy production rate. The energy-generating rate of the energy-generating device for the first horizon is represented by straight line 5a. The energy production rate for the second horizon 5b is also represented by a straight line, but it is above the energy production rate of the first horizon. In the first two horizons, the state of charge of the energy-storage device is constant at the beginning and end of the horizon. In the third horizon, the average energy production rate of the energy-generating device to meet the energy demand of the third horizon is also shown by the line Sc. In addition, the dashed lines 6 show the additional energy variants where the state of charge of the energy-storage device is not the same at the beginning and at the end of the horizon.

FIG. 7 shows the exemplary possibilities of dividing a route with seven route sections into horizons. For example, a horizon has seven route sections and seven horizons each have one route section. These are the minimum and maximum numbers The intermediate numbers are, for example, when forming three horizons first horizon 1, second horizon 2 and third horizon 3 route sections. Of course, other divisions are also possible.

FIG. 8 shows a flow chart of the method, which is preferably computer-implemented on a rail vehicle with a fuel cell and a battery. First, in step A, a route to be driven is divided into sections. In step B, horizons are assigned to the route sections, where the number of horizons cannot be greater than the number of route sections. In step C, the energy demand and the state of charge are calculated for all horizons and their horizon variants. In step D, the horizon variants of all horizons are then evaluated based on the quality assessment. In step E, the quality assessment is then used to determine the optimal variant for energy-storage device and energy-generating device. In step F, the rail vehicle is then operated in the respective route section with the optimal determined energy distribution rate of the energy-generating device, i.e., the fuel cell. In step F, the rail vehicle arrives at the end of the respective route section, so that the calculation for the subsequent route sections can be performed again.

Figure 9:
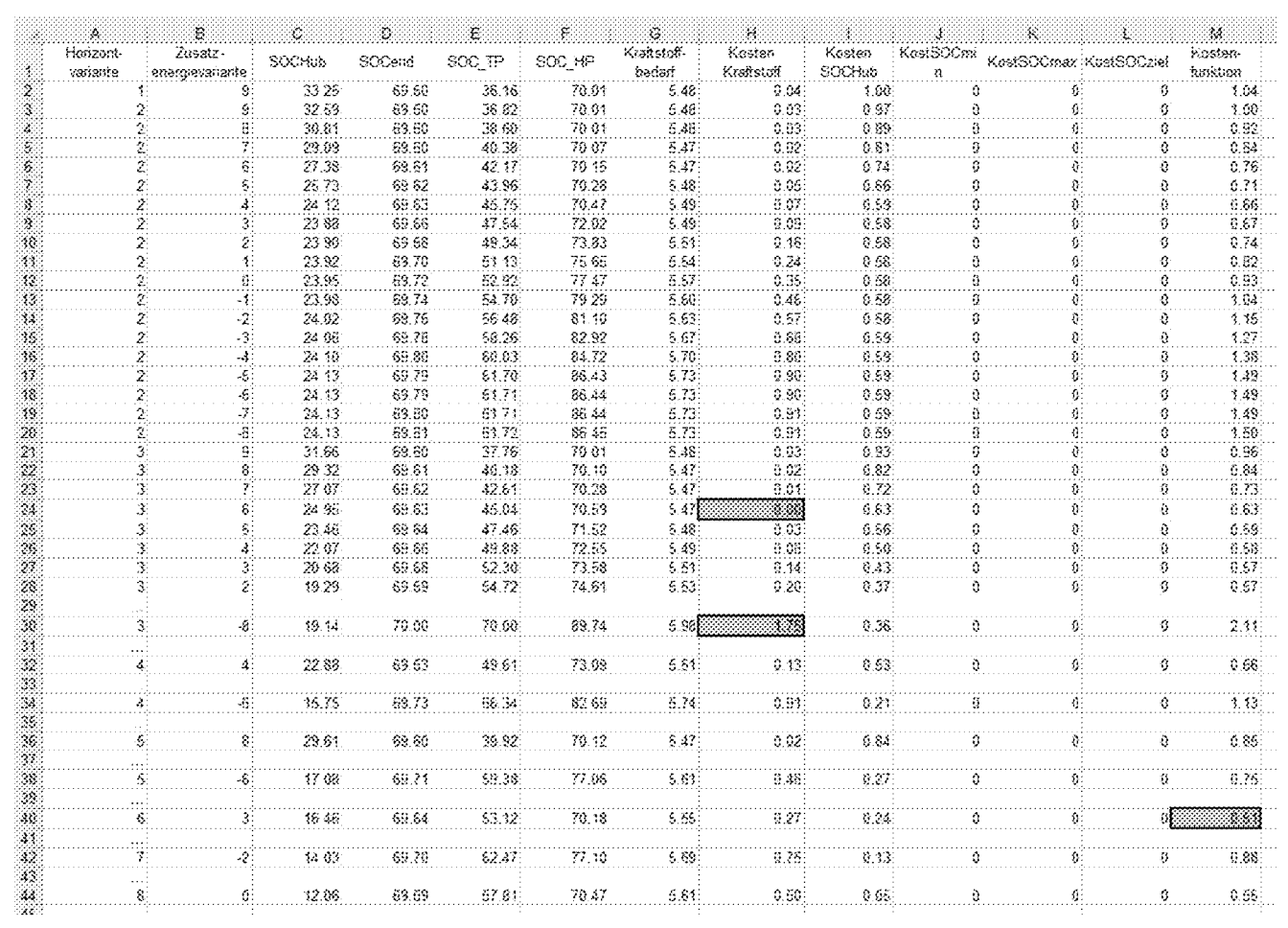

FIG. 9 shows a cost matrix for the quality function. Each row represents a solution variant, defined by the respective horizon variant (column A) and the additional energy variant in column B. The underlying driving task for this example consists of 8 route sections. Accordingly, there are 8 horizon variants with 18 additional energy variants each. For the sake of clarity, not all solution variants are shown in FIG. 9. Columns C-G show the simulation results for each solution variant. Columns H-L show the individual cost terms as described on pages 8-9. Finally, row M shows the total cost value for each solution variant. In row 24 is the solution variant with the lowest fuel demand, the cost term is therefore 0. In row 30 is the solution variant with the highest fuel demand, the cost term fuel is here maximum, i.e. 1 multiplied by the weighting λ1 of 1.75. In row 40 is the least expensive solution variant.

The invention claimed is:

1. A method for optimizing the driving strategy of a rail vehicle having an energy-generating device and an energy-storage device, comprising the steps of
dividing a route to be driven into at least one route section,
combining the at least one route section into at least one horizon,
determining an energy demand of the at least one horizon,
determining a substantially constant energy consumption rate of the energy-generating device of the rail vehicle for the horizon, at which a state of charge of the energy-storage device for the horizon lies within an optimum range.

2. The method according to claim 1, wherein the method is a computer-implemented method.

3. The method according to claim 1, wherein the route to be driven is divided into several route sections.

4. The method according to claim 1, wherein the optimum range of the state of charge is 30-70% of the maximum charge.

5. The method according to claim 4, wherein the optimum range of the state of charge is 40-60% of the maximum charge.

6. The method according to claim 1, wherein horizon variants are formed which comprise a minimum number, a maximum number and at least one intermediate number, the minimum number of horizons being one, the maximum number of horizons corresponding to the number of route sections and the intermediate number lying between the minimum and maximum numbers.

7. The method according to claim 6, wherein the intermediate number corresponds to the number of route sections minus 2.

8. The method according to claim 7, wherein a quality assessment of the horizon variants and/or the additional energy variants is carried out, the quality assessment taking into account at least one of the following factors: predicted fuel consumption on the overall route and/or charge level variation of the energy-storage system on the overall route and/or exceeding or falling below charge level limits on the overall route and/or deviation of an actual charge level of the energy-storage device at the end of the overall route from a predicted charge level at the beginning of the overall route, the quality assessment being used to determine the most favourable energy distribution rate.

9. The method according to claim 1, wherein a proportional total energy demand of the route to be driven is determined for each horizon.

10. The method according to claim 1, wherein additional energy variants are determined for each horizon, each of which leads to a non-charge-sustaining operation during the horizon.

11. The method according to claim 10, wherein the additional energy variants lie in an additional energy range whose first limit corresponds to a proportional total energy demand of the route to be travelled on the horizon and whose second limit is the sum of the proportional total energy demand of the route to be travelled on the horizon and twice the difference between the energy demand of the horizon and the proportional total energy demand of the horizon.

12. The method according to claim 11, wherein the additional energy variants are defined in such a way that the individual additional energy variants each have the same distance from one another.

13. The method according to claim 12, wherein the distance in each case lies in the range of 5% of the additional energy range.

14. A method for optimizing the driving strategy of a rail vehicle comprising an energy-generating device and an energy-storage device, wherein the method according to claim 1 is repeated for the remaining route sections after passing through a route section.

15. A data processing apparatus comprising means for carrying out the method according to claim 1.

16. A rail vehicle having an energy-storage device, an energy-generating device, and a data-processing apparatus according to claim 15.

17. A computer program product comprising instructions which, when the method is executed by a computer, cause the computer to execute the method according to claim 1.

18. A computer-readable medium on which the computer program product of claim 17 is stored.

* * * * *